United States Patent
Iwaki

[11] Patent Number: 6,052,232
[45] Date of Patent: Apr. 18, 2000

[54] MOLDED PLASTIC LENS

[75] Inventor: Makoto Iwaki, Saitama, Japan

[73] Assignee: Asahi Kogaku Kogyo Kabushiki Kaisha, Tokyo, Japan

[21] Appl. No.: 09/069,211

[22] Filed: Apr. 29, 1998

[30] Foreign Application Priority Data

May 2, 1997 [JP] Japan ................................ 9-130368

[51] Int. Cl.[7] ............................... G02B 3/00; G02B 7/02
[52] U.S. Cl. ......................... 359/642; 359/811; 359/819
[58] Field of Search ............................. 359/642, 811, 359/819

[56] References Cited

U.S. PATENT DOCUMENTS

| | | |
|---|---|---|
| 4,183,661 | 1/1980 | Ohkura . |
| 5,257,145 | 10/1993 | Kanazawa et al. ................ 359/819 |
| 5,290,620 | 3/1994 | Shono . |
| 5,757,559 | 5/1998 | Nomura . |

*Primary Examiner*—Scott J. Sugarman
*Attorney, Agent, or Firm*—Greenblum & Bernstein, P.L.C.

[57] ABSTRACT

A plastic lens is molded from a suitable transparent thermoplastic resin, and has a lens body and an annular portion integrally formed around the lens body. The annular portion has an annular surface, as a first positioning surface, extending perpendicularly from a peripheral outer edge of a lens surface of the lens body with respect to an optical axis of the lens body, and a peripheral cylindrical surface, as a second positioning surface, extending perpendicularly with respect to the first positioning surface. A right-angled annular corner, defined by an intersection of a hypothetical extension of the first positioning surface and a hypothetical extension of the second positioning surface, is eliminated.

14 Claims, 7 Drawing Sheets

MOLDED PLASTIC LENS

BACKGROUND OF THE INVENTION

1. Field of the Invention

The present invention relates to a plastic lens, molded from a suitable transparent thermoplastic resin, which may be used, for example, in an optical reading system of a laser-disk reader for reading optical signals from a laser-disk with a laser beam projected through the optical reading system.

2. Description of the Related Art

Conventionally, in an optical reading system of a laser-disk reader, a molded small sized plastic lens, which is formed of a suitable transparent thermoplastic resin, is used as an objective lens. This plastic lens is assembled in a lens holder incorporated in the optical reading system of the laser-disk reader. In assembling the plastic lens in the lens holder, the plastic lens must be correctly positioned in place with respect to the lens holder, such that optical signals can be read from a laser-disk by the plastic lens.

To correctly position the plastic lens with respect to the lens holder, the plastic lens has two positioning surfaces, which are arranged so as to abut two corresponding positioning surfaces provided on the lens holder. Namely, the assembly of the plastic lens in the lens holder is carried out such that the respective positioning surfaces of the plastic lens abut the corresponding positioning surfaces of the lens holder, resulting in the plastic lens being properly positioned with respect to the lens holder.

Specifically, the plastic lens includes a lens body, a small-diameter collar portion integrally formed around the lens body and a large-diameter collar portion integrally formed around the lens body. An annular shoulder surface is defined between the small-diameter collar portion and the large-diameter collar portion, and serves as a first positioning surface, which extends perpendicularly with respect to an optical axis of the lens body. A peripheral cylindrical surface of the small-diameter collar, which extends perpendicularly with respect to the first positioning surface, has a central longitudinal axis coinciding with the optical axis of the lens body, and serves as a second positioning surface.

The lens holder has a bore formed therein, and a flat annular surface area surrounding a peripheral circular edge of an opening of the bore, which extends perpendicularly with respect to a central longitudinal axis of the bore. The flat annular surface area serves as a first positioning surface, which operates in conjunction with the first positioning surface of the plastic lens. A peripheral cylindrical surface of the bore, which operates in conjunction with the second positioning surface of the plastic lens, extends perpendicularly with respect to the first positioning surface, and serves as a second positioning surface.

The second positioning surface of the lens holder, having an inner diameter substantially equal to an outer diameter of the small-diameter collar portion of the plastic lens, allows assembly of the plastic lens in the lens holder to be carried out by fitting the small-diameter collar portion of the plastic lens into the bore. Namely, when the small-diameter collar portion of the plastic lens is fitted into the bore, the plastic lens can be correctly positioned in place with respect to the lens holder, so that the optical axis of the plastic lens and the central longitudinal axis of the lens holder coincide with each other. Nevertheless, the completely assembled conventional plastic lens is bulky, due to the existence of the first and second collar portions integrally formed around the lens body.

SUMMARY OF THE INVENTION

Therefore, an object of the present invention is to provide a compactly-configured plastic lens, which can be correctly located with respect to a lens holder therefor.

In accordance with the present invention, there is provided a plastic lens molded from a suitable transparent thermoplastic resin, comprising: a lens body; and an annular portion integrally formed around the lens body, such that the annular portion has an annular surface, as a first positioning surface, extending perpendicularly from a peripheral outer edge of a lens surface of the lens body with respect to an optical axis of the lens body, and a peripheral cylindrical surface, as a second positioning surface, extending perpendicularly with respect to the first positioning surface, wherein a projecting right-angled annular corner portion, defined by an intersection of a hypothetical extension of the first positioning surface and a hypothetical extension of the second positioning surface, is eliminated.

The elimination of the projecting right-angled annular corner may be substituted for a formation of either an annular groove or a tapered annular face between the first and second positioning surfaces. When the elimination of the projecting right-angled annular corner is substituted for a formation of the annular groove between the first and second positioning surfaces, the annular groove is preferably formed as a V-shaped groove in a longitudinal-section, which may be right-angled.

The first positioning surface may be formed as a part of the annular surface of the annular portion, which is preferably extended over an angle of more than 180 degrees. Optionally, the first positioning surface may be formed as a continuous annular surface. Also, the first positioning surface may defined by discontinuous arcuate surface sections surrounding the lens face of the lens body.

Similarly, the second positioning surface may be formed as a part of the peripheral cylindrical surface of the annular portion, which is preferably extended over an angle of more than 180 degrees. Optionally, the second positioning surface may be formed as a continuous peripheral cylindrical surface. Further, the second positioning surface may be defined by discontinuous peripheral cylindrical surface sections surrounding the annular portion.

BRIEF DESCRIPTION OF THE DRAWINGS

This object and other objects of the present invention will be better understood from the following description, with reference to the accompanying drawings, in which.

DESCRIPTION OF THE PREFERRED EMBODIMENTS

Figure 1:
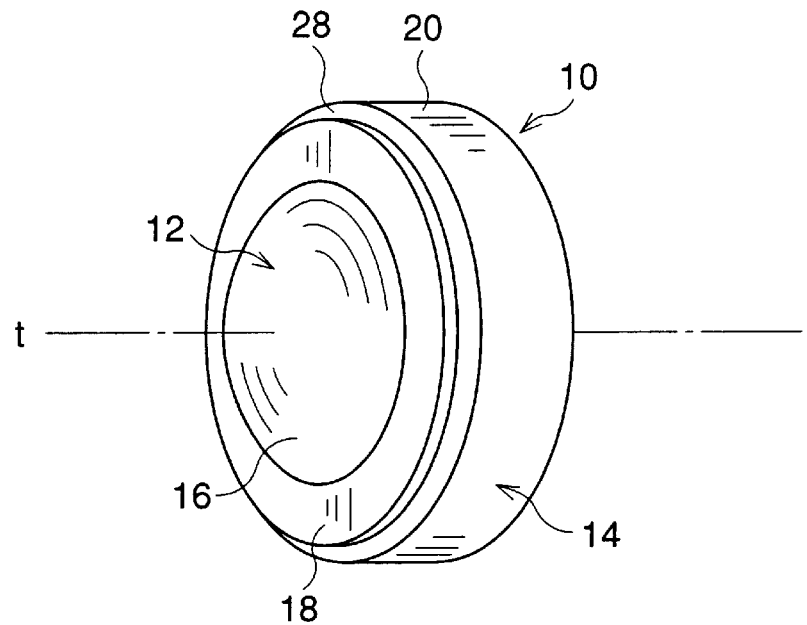
FIG. 1 is a perspective view showing a plastic lens according to the present invention.
Figure 2:
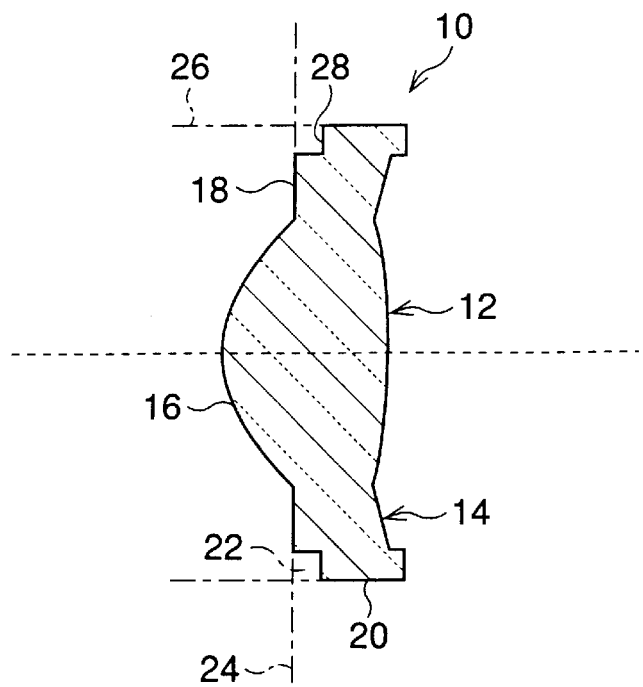
FIG. 2 is a longitudinally-sectioned view of the plastic lens shown in FIG. 1.

FIGS. 1 and 2 show a plastic lens, generally indicated by reference 10, which is molded from a suitable transparent thermoplastic resin, such as a cyclic olefin copolymer. The plastic lens 10 is used, for example, in an optical reading system of a laser-disk reader for reading optical signals from a laser-disk with a laser beam projected through the optical reading system.

The plastic lens 10 includes a lens body 12 and an annular portion 14 integrally formed around the lens body 12. The lens body 12 has a lens surface area 16, and the annular portion 14 has a first annular positioning surface 18 extending perpendicularly and continuously from a peripheral annular edge of the lens surface area 16 with respect to an optical axis of the lens body 12, indicated by reference t. The annular portion 14 has an outermost peripheral cylindrical surface 20, which extends perpendicularly with respect to the first annular positioning surface 18. The outermost peripheral cylindrical surface 20 has a central axis coinciding with the optical axis t of the lens body 12, and serves as a second annular positioning surface.

In a case where the plastic lens 10 is molded such that the first and second positioning surfaces 18 and 20 are formed on the annular portion 14 of the plastic lens 10, molds for molding the plastic lens 10 are liable to be designed so that a projecting annular corner portion 22, defined by an intersection of a hypothetical extension 24 of the first positioning surface 18 and a hypothetical extension 26 of the second positioning surface 20, is formed on the plastic lens 10, the projecting annular corner portion 22 having a right angle in a longitudinally-sectioned view, as is apparent from FIG. 2.

Nevertheless, according to the present invention, the molds for the plastic lens 10 are preferably designed such that the formation of the projecting right-angled annular corner portion 22 is eliminated, as stated in detail hereinafter. Namely, in the embodiment as shown in FIGS. 1 and 2, the plastic lens 10 features an annular perimeter recess or annular groove 28 defined between the first and second positioning surfaces 18 and 20. The annular perimeter recess or annular groove 28, when viewed in a longitudinal section, is preferably formed as a V-shaped groove having a right angle.

Figure 3:
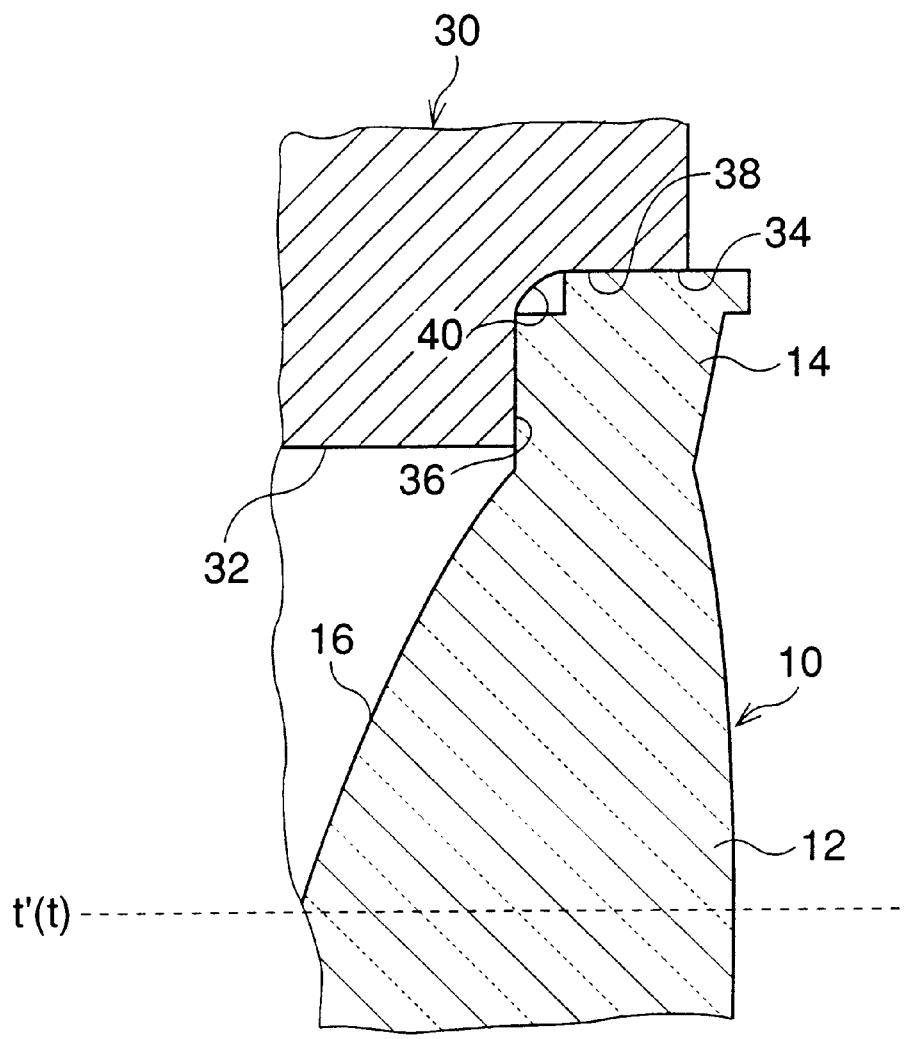
FIG. 3 is an enlarged partial longitudinally-sectioned view showing a lens holder assembled with the plastic lens of FIGS. 1 and 2.

Referring to FIG. 3, the plastic lens 10 is assembled in a lens holder 30, which may be incorporated in the optical reading system of the laser-disk reader. The lens holder 30 may be formed from either a suitable metal or a suitable synthetic resin, and has a small-diameter bore 32 and a large-diameter bore 34, which are concentrically arranged with respect to each other.

The large-diameter bore 34 has an annular bottom surface 36 extending perpendicularly with respect to a central longitudinal axis t' of the bores 32 and 34, and the annular bottom surface 36 serves as a first positioning surface, which abuts the first positioning surface 18 of the plastic lens 10 when assembled. A cylindrical surface 38 of the large-diameter bore 34 extends perpendicularly with respect to the annular bottom surface or first positioning surface 36, and serves as a second positioning surface, which abuts the second positioning surface 20 of the plastic lens 10 when assembled.

The cylindrical surface or second positioning surface 38 of the lens holder 30 has an inner diameter which is substantially equal to an outer diameter of the annular portion 14 of the plastic lens 10, and thus the assembling of the plastic lens 10 in the lens holder 30 can be carried out by fitting the plastic lens 10 into the large-diameter bore 34, as shown in FIG. 3.

When the plastic lens 10 is fitted into the large-diameter bore 34, due to the first positioning surface 18 of the plastic lens 10 abutting the first positioning surface 36 of the lens holder 30 and the second positioning surface 20 of the plastic lens 10 abutting the second positioning surface 38 of the lens holder 30, the plastic lens 10 is correctly positioned in place with respect to the lens holder 30, and thus the optical axis t of the plastic lens 10 and the central longitudinal axis t' of the lens holder 30 coincide with each other.

Usually, the small-diameter and large-diameter bores 32 and 34 of the lens holder 30 are formed in a blank by a drilling or boring machine. When the formation of the large-diameter bore 34 in the blank is performed by the drilling or boring machine, a rounded corner area, indicated by reference 40, is inevitably left as the transition between the first and second positioning surfaces 36 and 38 occurs. Namely, it is virtually impossible to form a right-angled corner between the first and second positioning surfaces 36 and 38, when using the drilling or boring machine.

Accordingly, if the plastic lens 10 is formed with the projecting right-angled annular corner portion 22, between the first and second positioning surfaces 18 and 20, the plastic lens 10 cannot be properly fitted into the large-diameter bore 34. Nevertheless, in the present embodiment, since the plastic lens 10 features the annular perimeter recess or annular groove 28 defined between the first and second positioning surfaces 18 and 20, it is possible to correctly locate the plastic lens 10 in the large-diameter bore 34, as shown in FIG. 3.

Figure 4:
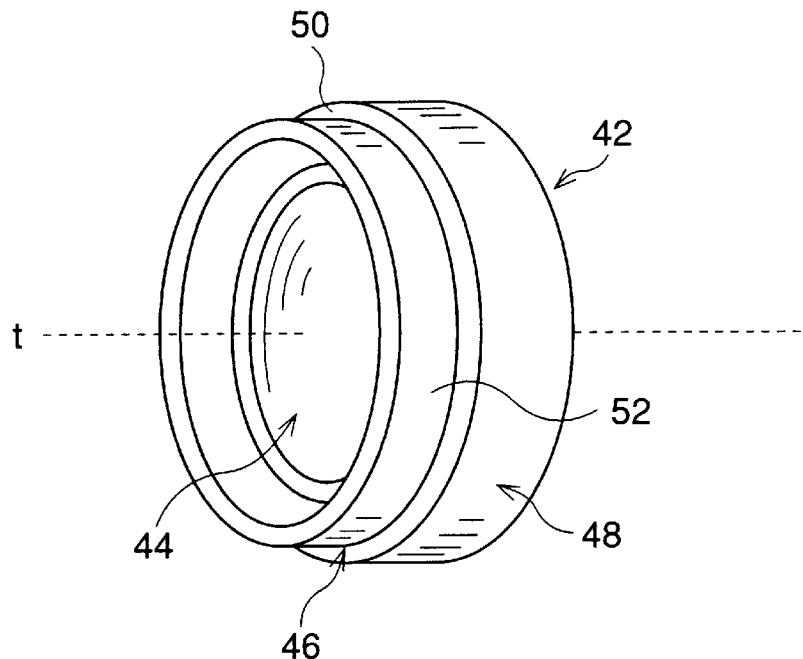
FIG. 4 is a perspective view showing a conventional plastic lens.
Figure 5:
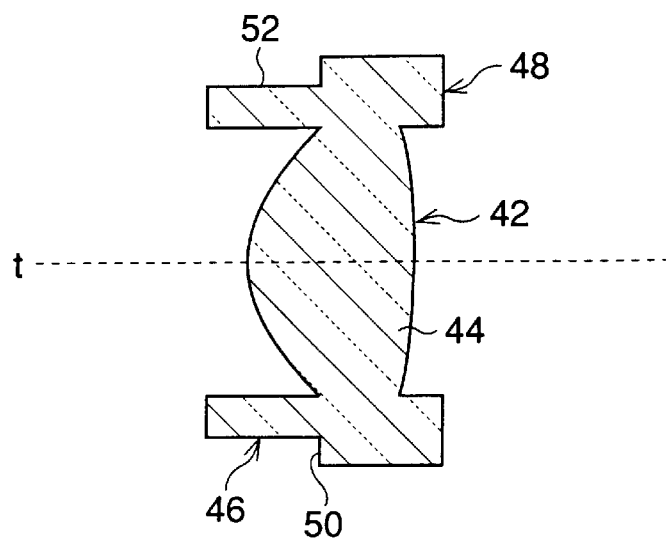
FIG. 5 is a longitudinally-sectioned view of the plastic lens shown in FIG. 4.

For comparison with the plastic lens 10 according to the present invention, a conventional plastic lens is shown in FIGS. 4 and 5, and is generally indicated by reference 42. Similar to the plastic lens 10, the plastic lens 42 also is molded from a suitable transparent thermoplastic resin, such as a cyclic olefin copolymer. The plastic lens 42 includes a lens body 44, a small-diameter collar portion 46 integrally formed around the lens body 44 and a large-diameter collar portion 48 integrally formed around the lens body 44.

An annular shoulder surface 50 is defined between the small-diameter collar portion 46 and the large-diameter collar portion 48, and serves as a first positioning surface, which extends perpendicularly with respect to an optical axis t of the lens body 44. A peripheral cylindrical surface 52 of the small-diameter collar 46 has a central longitudinal axis coinciding with the optical axis t of the lens body 44, and serves as a second positioning surface, which extends perpendicularly with respect to the annular shoulder surface 50.

Figure 6:
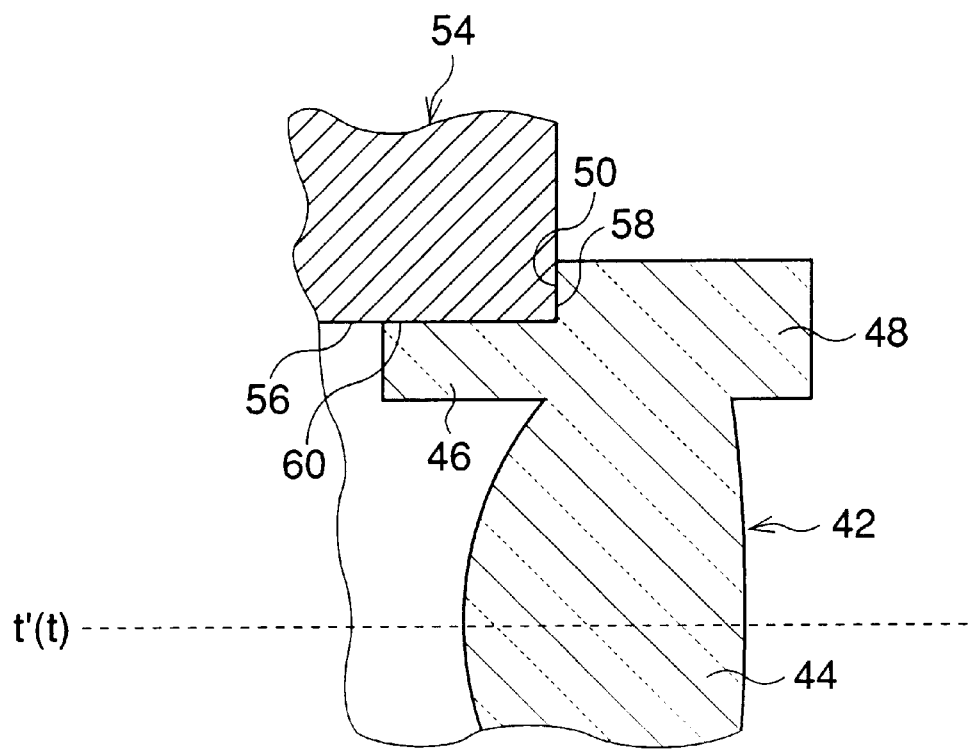
FIG. 6 is an enlarged partial longitudinally-sectioned view showing a lens holder assembled with the plastic lens of FIGS. 4 and 5.

Referring to FIG. 6, the plastic lens 42 is assembled in a lens holder 54, which may be incorporated in the optical reading system of the laser-disk reader. Similar to the plastic lens 10, the lens holder 54 also may be formed from either a suitable metal or a suitable synthetic resin.

The lens holder 54 has a bore 56 formed therein, and a flat annular surface area 58, which surrounds a peripheral circular edge of an opening of the bore 56, extends perpendicularly with respect to a central longitudinal axis t' of the bore 56. The flat annular surface area 58 serves as a first positioning surface, which operates in conjunction with the first positioning surface 50 of the plastic lens 42. A peripheral cylindrical surface of the bore 56 extends perpendicularly with respect to the first positioning surface 58, and serves as a second positioning surface 60, which operates in conjunction with the second positioning surface 52 of the plastic lens 42.

The cylindrical surface or second positioning surface 60 of the lens holder 54 has an inner diameter which is substantially the same as an outer diameter of the small-diameter collar portion 46 of the plastic lens 42, and thus the assembling of the plastic lens 42 in the lens holder 54 can be carried out by fitting the small-diameter collar portion 46 of the plastic lens 42 into the bore 56, as shown in FIG. 6.

When the small-diameter collar portion 46 of the plastic lens 42 is fitted into the bore 56, due to the first positioning surface 50 of the plastic lens 42 abutting the first positioning surface 58 of the lens holder 30 and the second positioning surface 52 of the plastic lens 42 abutting the second positioning surface 60 of the lens holder 54, the plastic lens 42 is properly positioned in place with respect to the lens holder 54, and thus the optical axis t of the plastic lens 42 and the central longitudinal axis t' of the lens holder 54 coincide with each other.

In the conventional lens holder 54, the formation of the first and second positioning surfaces 58 and 60 of the lens holder 54 on a blank is relatively easy. Nevertheless, in comparison with the plastic lens 10 according to the present invention, an overall configuration of the conventional plastic lens 42 is bulky, due to the existence of the first and second collar portions 46 and 48 integrally formed around the lens body 44.

Figure 7:
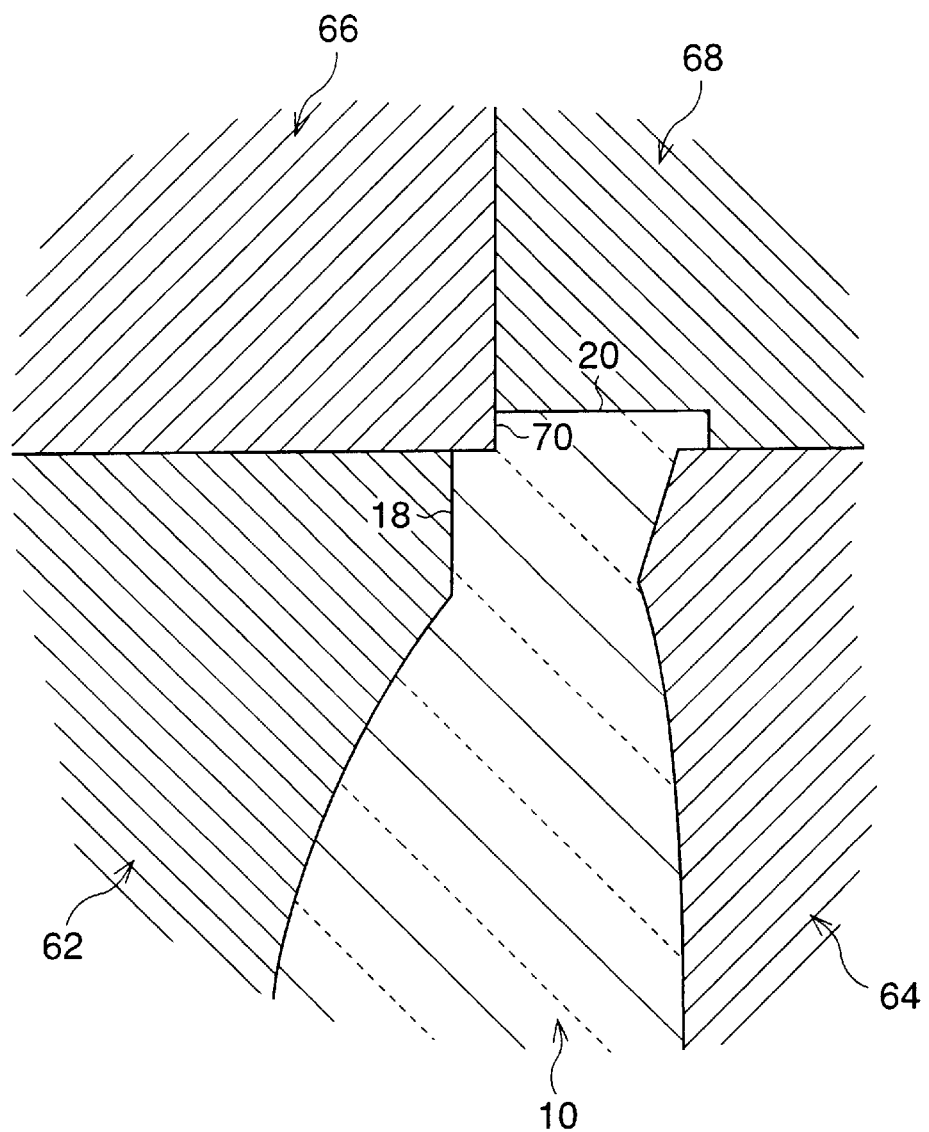
FIG. 7 is an enlarged partial longitudinally-sectioned view showing a mold assembly for molding the plastic lens shown in FIGS. 1 and 2.

FIG. 7 partially shows a mold assembly for molding the plastic lens 10, including a pair of inner molds 62 and 64 and a pair of outer molds 66 and 68 to define a cavity in which the plastic lens 10 is molded. The pair of inner molds 62 and 64 mainly serves as molds for defining both side-face profiles of the plastic lens 10, and the pair of outer molds 66 and 68 mainly serves as molds for defining a peripheral profile of the plastic lens 10.

As is apparent from FIG. 7, the inner mold 62 and the outer mold 68 contribute in defining the respective first and second positioning surfaces 18 and 20. Also, the mold 66 is provided with a projecting annular corner 70 having a right angle in a longitudinally-sectioned view, and this projecting right-angled annular corner 70 defines the annular perimeter recess or annular groove 28 of the annular portion 14 of the plastic lens 10. Of course, as shown in FIG. 7, it is preferable to form the annular perimeter or annular groove 28 in the annular portion 14 at the same time as the plastic lens 10 is molded.

Nevertheless, the plastic lens 10, having the projecting right-angled annular corner portion 22, may be molded, if necessary. In this case, the projecting right-angled annular corner portion 22 is removed by machining after the molding, so that the annular perimeter recess or annular groove 28 is formed in the annular portion 14 of the plastic lens 10.

Figure 8:
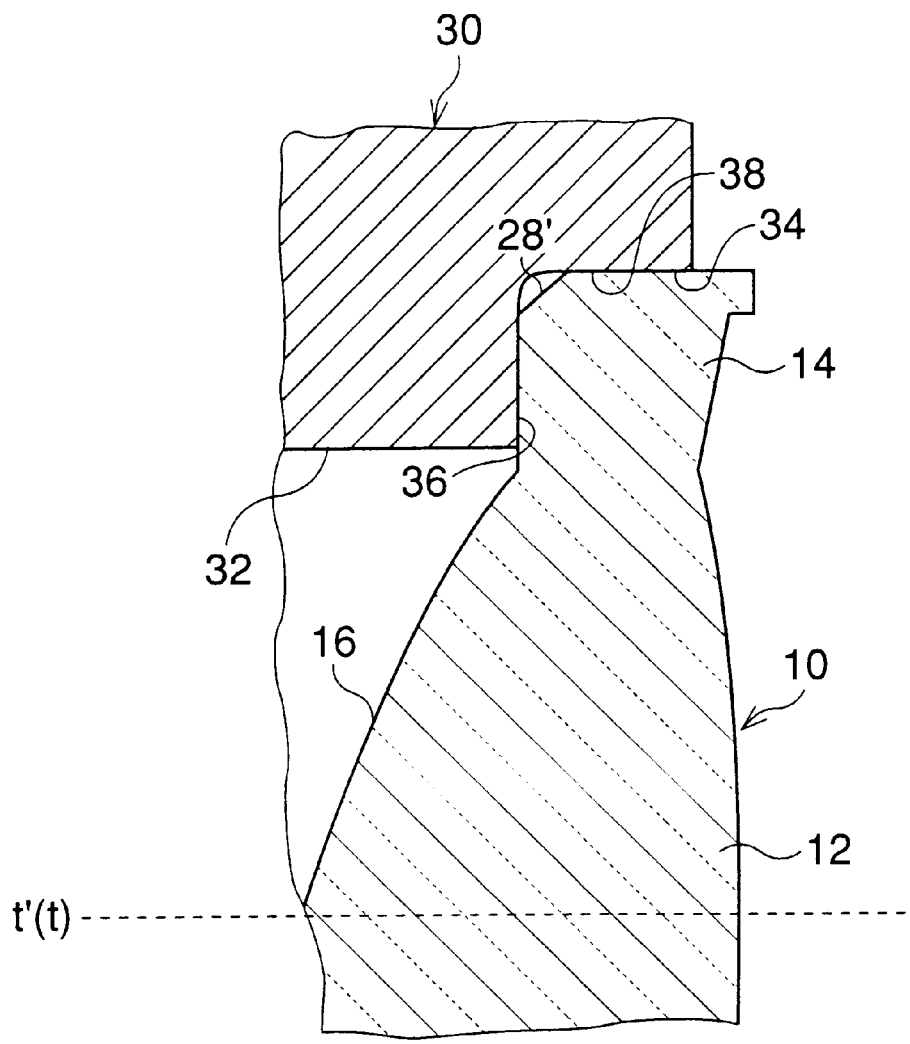
FIG. 8 is an enlarged partial longitudinally-sectioned view similar to FIG. 3, showing a modification of the plastic lens shown FIGS. 1 to 3.

FIG. 8 shows a modification of the embodiment of the plastic lens 10 shown in FIGS. 1 to 3. Note, in FIG. 8, the references identical to those in FIG. 3 represent the same elements. As is apparent from this drawing, in this modified embodiment, a chamfered or tapered annular face 28' is substituted for the annular perimeter recess or annular groove 28. The proper fitting of the plastic lens 10 in the large-diameter bore 38 can be ensured due to the chamfered or tapered annular face 28'.

Of course, although the chamfered or tapered annular face 28' is preferably formed on the annular portion 14 at the time of molding of the plastic lens 10, the chamfered or tapered annular face 28' may be formed by machining subsequent to the molding.

Figure 9:
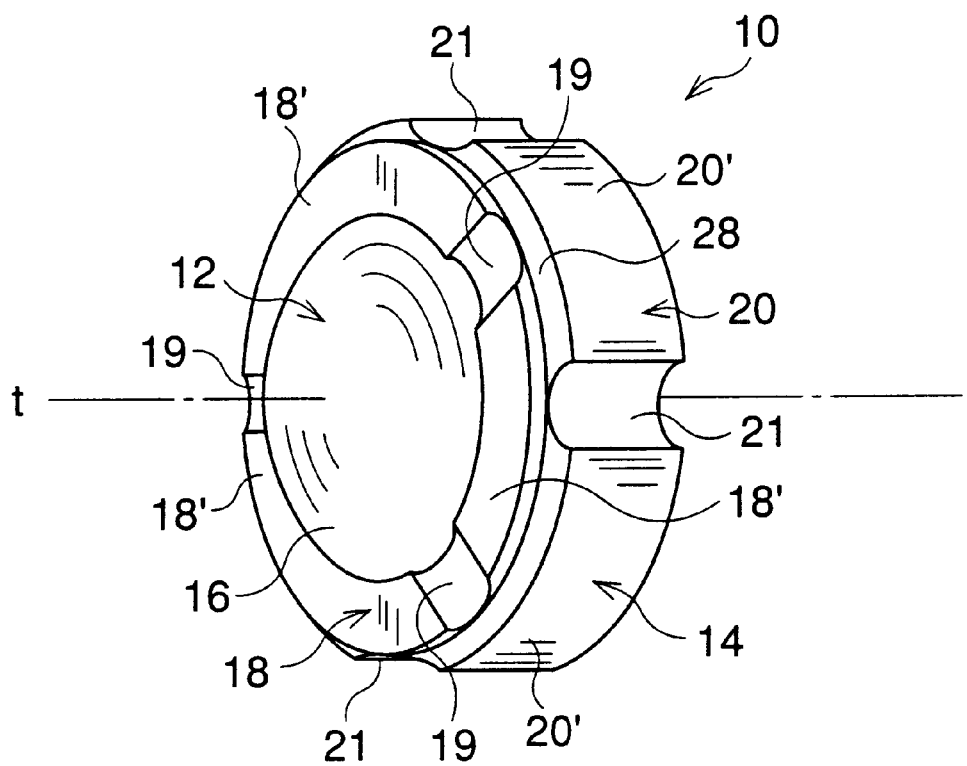
FIG. 9 is a perspective view of another modification of the plastic lens shown in FIGS. 1 to 3.

FIG. 9 shows another modification of the embodiment of the plastic lens 10 shown in FIGS. 1 to 3. Note, in FIG. 9, the references identical to those in FIG. 1 represent the same elements. In this modified embodiment, the first positioning surface 18 is defined by three discontinuous arcuate surface sections 18', separated from each other by three recesses 19 formed therein at regular intervals. Similarly, the second positioning surface 20 is defined by four arcuate peripheral cylindrical surface sections 20', separated from each other by recesses 21 formed therein at regular intervals. Namely, each of the first and second positioning surfaces 18 and 20 may not necessarily be formed as a continuous surface. This is also true for the first and second positioning surfaces 36 and 38 of the lens holder 30.

Thus, by using discontinuous surfaces, an amount of material required when molding the plastic lens is reduced, and consequently, the manufacturing cost is suppressed.

In addition, in the respective embodiments shown in FIGS. 1 to 3 and in FIG. 8, the first positioning surface may be formed as a part of the annular surface 18 extended over an angle of more than 180 degrees. Similarly, the second positioning surface may be formed as a part of the peripheral cylindrical surface 20 extended over an angle of more than 180 degrees.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-130368 (filed on May 2, 1997) which is expressly incorporated herein, by reference, in its entirety.

I claim:

1. A plastic lens molded from a transparent thermoplastic resin, comprising:

a lens body; and an annular portion integrally formed around said lens body, said annular portion having an annular surface, said annular surface comprising a first positioning surface that extends perpendicularly from a peripheral outer edge of a lens surface of the lens body with respect to an optical axis of said lens body, and a peripheral cylindrical surface, said peripheral cylindrical surface comprising a second positioning surface that extends perpendicularly with respect to said first positioning surface, such that a projecting right-angled annular corner portion, defined by an intersection of an extension of said first positioning surface and an extension of said second positioning surface, is eliminated, said first positioning surface serving to define a position of said lens body along the optical axis when assembled, said second positioning surface serving to define a position of said lens body in a direction perpendicular to the optical axis when assembled.

2. A plastic lens as set forth in claim 1, wherein the elimination of said projecting right-angled annular corner portion is substituted for a formation of an annular groove between said first positioning surface and said second positioning surface.

3. A plastic lens as set forth in claim 2, wherein said annular groove is formed as a V-shaped groove in a longitudinal-section.

4. A plastic lens as set forth in claim 3, wherein said V-shaped groove is a right-angled V-shaped groove.

5. A plastic lens as set forth in claim 1, wherein the elimination of said projecting right-angled annular corner portion is substituted for a formation of a tapered annular face between said first positioning surface and said second positioning surface.

6. A plastic lens as set forth in claim 1, wherein said first positioning surface is at least a part of the annular surface of said annular portion.

7. A plastic lens as set forth in claims 6, the part of said annular surface of said annular portion extends over an angle of more than 180 degrees.

8. A plastic lens as set forth in claim 1, wherein said first positioning surface is a continuous annular surface.

9. A plastic lens as set forth in claim 1, wherein said first positioning surface is defined by discontinuous arcuate surface sections surrounding the lens face of said lens body.

10. A plastic lens as set forth in claim 1, wherein said second positioning surface is at least a part of the peripheral cylindrical surface of said annular portion.

11. A plastic lens as set forth in claim 10, wherein the part of said peripheral cylindrical surface of said annular portion extends over an angle of more than 180 degrees.

12. A plastic lens as set forth in claim 1, wherein said second positioning surface is a continuous peripheral cylindrical surface.

13. A plastic lens as set forth in claim 1, wherein said second positioning surface is defined by discontinuous peripheral cylindrical surface sections surrounding said annular portion.

14. A combination of a plastic lens, and a lens holder;

said plastic lens including a lens body and an annular portion integrally formed around said lens body, said annular portion having an annular surface, said annular surface comprising a first positioning surface that extends perpendicularly from a peripheral outer edge of a lens surface of the lens body with respect to an optical axis of said lens body, and a peripheral cylindrical surface, said peripheral cylindrical surface comprising a second positioning surface that extends perpendicularly with respect to said first positioning surface, a projecting right-angled annular corner portion, defined by an intersection of an extension of said first positioning surface and an extension of said second positioning surface, being eliminated;

said lens holder having a bore formed therein, said bore having an annular bottom surface extending perpendicularly with respect to a central longitudinal axis of said bore, said annular bottom surface comprising a first positioning surface of said lens holder, which abuts the first positioning surface of said plastic lens, a peripheral cylindrical surface of said bore extending perpendicularly with respect to said annular bottom surface, said peripheral cylindrical surface of said bore comprising a second positioning surface of said lens holder, which abuts the second positioning surface of said plastic lens; and said second positioning surface of said lens holder having an inner diameter which is substantially equal to an outer diameter of said annular portion of said plastic lens, whereby assembly of said plastic lens in said lens holder can be performned by fitting said plastic lens into said bore.

* * * * *